Oct. 13, 1964

J. A. BOYD 3,152,775

SUPERSONIC AIRCRAFT

Filed Aug. 19, 1963

INVENTOR.
JAMES A. BOYD

BY *Richard F. Carr*

ATTORNEY

Oct. 13, 1964 J. A. BOYD 3,152,775
SUPERSONIC AIRCRAFT
Filed Aug. 19, 1963 2 Sheets-Sheet 2
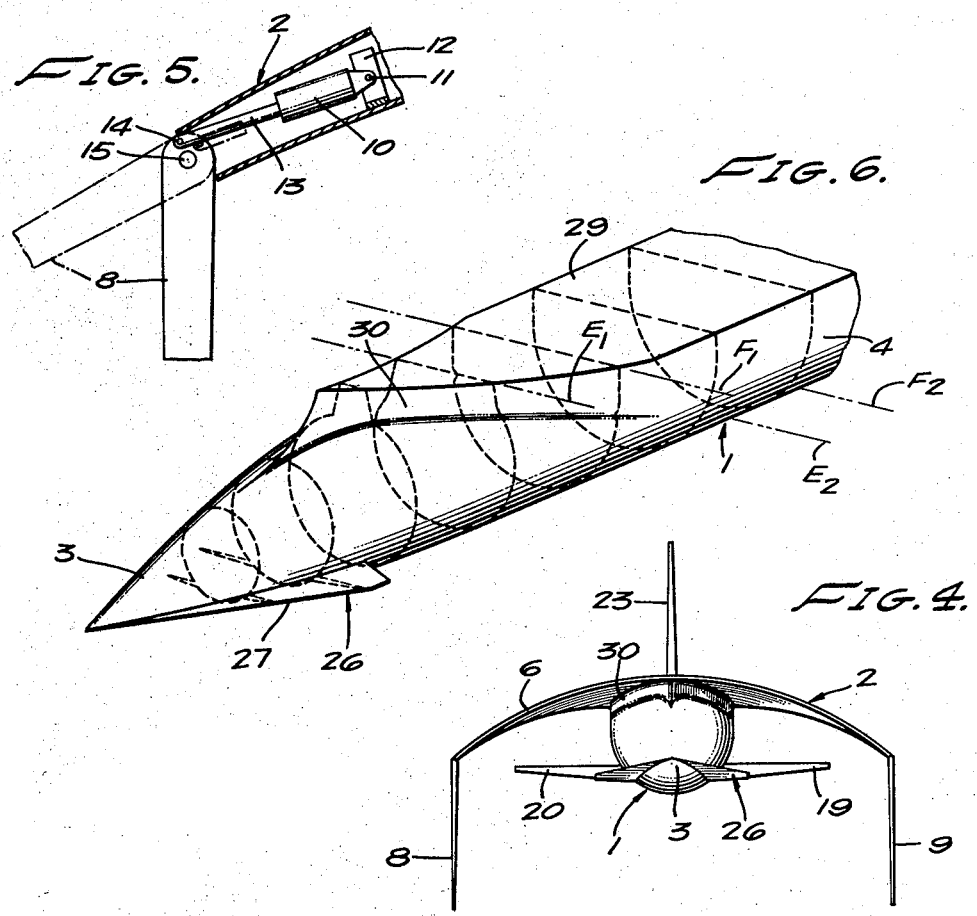
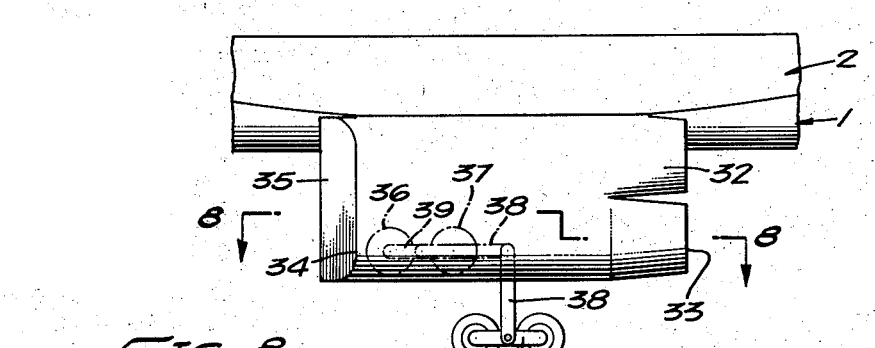
INVENTOR.
JAMES A. BOYD
BY
ATTORNEY United States Patent Office 3,152,775
Patented Oct. 13, 1964

3,152,775
SUPERSONIC AIRCRAFT
James A. Boyd, Rolling Hills Estates, Calif., assignor to North American Aviation, Inc.
Filed Aug. 19, 1963, Ser. No. 302,863
19 Claims. (Cl. 244—13)

This invention pertains to an aircraft capable of flight at high Mach numbers.

The design of aircraft having the ability to fly at higher supersonic velocities has imposed serious difficulties. With conventional wing surfaces, the ratio of lift to drag obtainable decreases materially above about Mach 2. This is true despite the fact that the drag coefficient for low aspect ratio aircraft decreases from its maximum at around Mach 1.2 to 1.5, as the Mach number becomes greater. The lack of available lift results because of the reduction of lifting effectiveness of wing surfaces as the Mach number increases. Consequently, it has been proposed to augment the lift of aircraft flying at Mach 2.5 or higher by the use of shock disturbances reacting against the wing so as to produce an upward force component. It was suggested that a shock wave for this purpose be created by volume elements such as wedges or semicones positioned on the wing's bottom surface. With the wing covering the body, the pressure rise produced by the bow shock can be contained under the wing area, and hence give a lifting force. It was hoped that the fuel, engines and payload of the aircraft could be incorporated in such bodies. Therefore, if a portion of the pressure rise at the shock wave caused by driving such a body through the air could be used to induce lift, there would be no drag penalty chargeable to this lift increment. In other words, the otherwise dissipated energy of the shock disturbance which the body volume necessarily would create at high Mach numbers could now be made to produce a body-induced lift on the wing.

In actual practice, however, little benefit was realized from such designs. It can be demonstrated that a half body under a wing, even at zero angle of attack, produces a drag approximately twice that of a full body of equivalent length and volume. This is because the reflection plane formed by the wing simulates flow conditions that would exist if there were a second half body present. The half body causes an additional drag penalty to occur as the wing angle of attack is increased. The drag of the half body then becomes even larger due to the resulting higher presures in the zone on the lower side of the wing. Moreover, half bodies result in considerably greater drag due to lift than do symmetrical arrangements. The lift produced by the half body results in an additional drag component on the wing the magnitude of which is proportional to the angle of attack.

Other designs utilizing body inducing lift principles have also been considered. This has included an arrowhead configuration for the wing surfaces, as well as the use of two half bodies instead of one. Neither of these has been of practical merit due to such problems as obtaining adequate structural strength, and in providing adequate visibility for the pilot.

One of the more promising designs theoretically has been the semi-ring wing, which includes a full body suspended by a strut beneath a wing formed as a semi-annulus. While it is possible by such a design to capture the shock wave disturbances, studies have shown that little actual reduction in drag can be achieved even at the supersonic design speed. Part of this difficulty arises from the fact that the body camber is unable to develop anything approaching ellipitcal axial load distribution, which is the theoretical ideal for an aircraft flying at supersonic speed. These considerations are coupled with problems of structural integrity due to the suspension of the body by a narrow strut. Also, the semi-ring allows air spillage at the wing tips and a consequent high vortex drag.

In the past, therefore, there has been no structurally practical design by which a body can be placed relative to a lifting wing such that the body induces a load on the wing without the drag on the body becoming greater than it would be in the absence of the wing. Also, optimum load distribution on the body was an unanswered problem. Furthermore, in the case of the semi-ring, a wing shape having low vortex drag coupled with high induced lift had not been devised.

The present design overcomes the difficulties of the prior art through the provision of an elongated full body located substantially at the axis of the double Mach cone of the aircraft. A lifting surface is attached to the upper edge of the body and positioned within the double Mach cone, the leading and trailing edges being located approximately at the surface of the double cone. The wing has a negative dihedral as well as end plates for capturing forebody disturbances. This also gives a large increase in lift near the earth's surface due to the ground effect from the air captured beneath the wing. The end plates may be shifted to a substantially horizontal position for subsonic flight in one embodiment of the invention. A canard surface may be carried by the body nose portion, extending rearwardly from the apex of the Mach cone, serving to distribute the lift load properly over the entire body length and reduce wave drag due to lift. The full body is attached to the wing undersurface along its top edge, providing a structurally sound connection. The contour of the body beneath the wing is such that equal areas are cut by all planes inclined at the local Mach angle that intersect the body.

Accordingly, it is an object of this invention to provide an aircraft configuration for high performance supersonic flight.

Another object of this invention is to provide an aircraft design having low drag and high lift throughout a speed range from subsonic to supersonic design speed.

Another object of this invention is to provide an aircraft having stability at all velocities, including transonic and supersonic velocities.

An additional object of this invention is to provide an aircraft configuration that minimizes wave drag and drag due to lift at design speeds.

Yet another object of this invention is to provide an aircraft that readily can be constructed of adequate structural strength and rigidity.

A still further object of this invention is to provide an aircraft having end plates for the wing devised to permit lift augmentation devices to be incorporated in the end plates.

These and other objects will become apparent from the following detailed description taken in connection with the accompanying drawing in which:

FIG. 4 is a front elevational view of the invention,

Figure 1:
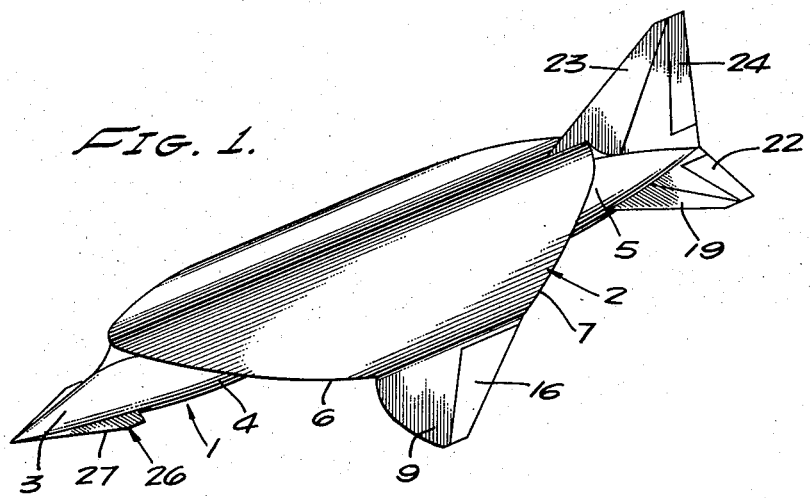
FIG. 1 is a perspective view of the aircraft of this invention.

FIG. 5 is an enlarged fragmentary view illustrating an arrangement for pivoting the end plates, FIG. 6 is an enlarged fragmentary perspective view illustrating a portion of the body with the wing removed, FIG. 7 is a fragmentary side elevational view showing an arrangement for mounting engines and landing gear in the end plates, and FIG. 8 is a sectional view taken along line 8—8 showing the manner in which the landing gear may retract into the center wedge of the engine inlet duct.

With reference to the drawing, the aircraft of this invention includes an elongated full body 1 connecting to a lifting surface 2. The latter member extends axially of the body 1 connecting to it along the upper edge of the body. This connection extends the length of the widest portion of the wing 2. As a result, a strong and rigid connection between the wing and body can be effected. No struts are used and the design easily can be constructed to withstand any forces that will be imposed upon the airframe.

The body 1 may be of arbitrary cross sectional shape and in length is generally eight to sixteen times its mean diameter. A pointed nose section 3 fairs into a central portion 4 of substantially constant cross section that tapers at the aft end 5. The connection to the wing 2 is along the upper edge of the central portion 4 of the body. The body, therefore, is substantially symmetrical fore and aft, and is located approximately along the axis of the double Mach cone of the aircraft. The bow shock cone generated by the forebody, indicated by the line A, approximates but is very slightly larger in vertex angle than the Mach cone for the aircraft. The imaginary line B represents the rear Mach cone, diverging outwardly in the forward direction from its apex at the tail of the aircraft. The included angle at the apices of the Mach cone is $$2 \arc\tan \frac{1}{\sqrt{M^2-1}}$$

where M is the Mach number. As used herein the term "Mach cone" is intended to include the actual bow shock cone encountered.

The wing 2 which may be of hyperbolic curvature, is disposed within the double cone A–B and dimensioned so that its leading edge 6 and its trailing edge 7 fall approximately along the surfaces of the double cone at the design speed. In other words, the leading edge 6 is substantially coincident with the forward shock cone line A, as seen in plan in FIG. 2, while the trailing edge 7 approximately falls along the rearward cone line B in that view. In actual practice it is preferred generally to locate the leading edge just behind the front shock cone while the trailing edge may be extended just behind the rear cone surface. This allows for the provision of sufficient control surface area. Also, if engines or other components are incorporated in the wing, it permits the volume to be faired out so that the resulting expansion does not lower the pressure on the fuselage afterbody. The advantage of this is explained below.

The wing 2 is given a negative dihedral, as illustrated, and terminates at its tips in end plates 8 and 9. The latter elements depend downwardly in the vertical direction for supersonic flight. The end plate dimensions are determined by intersecting a vertical plane at the wing tip with the double Mach cone A–B. The negative dihedral of the wing is to cut down the size requirements of the end plates, so that the wing assists in intercepting and reflecting disturbances inwardly, as will be discussed hereinafter. The dihedral should be such that the intersection of the end plate is at the centerline of the body at the maximum end plate chord.

Figure 2:
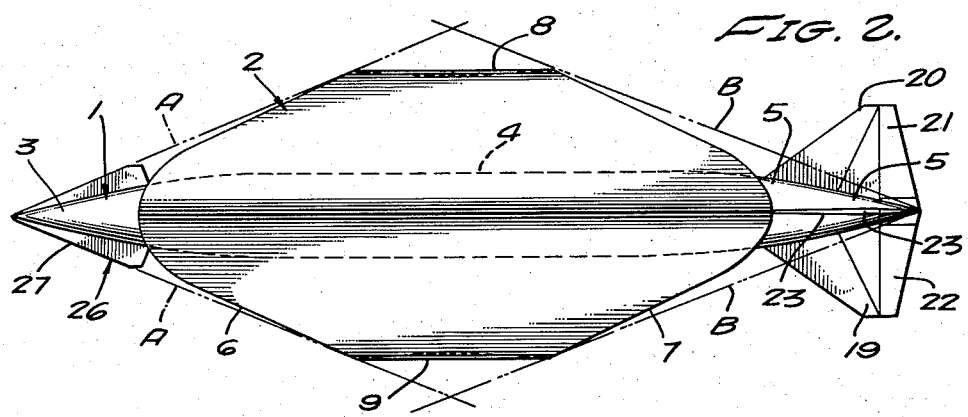
FIG. 2 is a top plan view of the aircraft.

It is preferred to make these end plates movable so that they may be shifted to substantially the horizontal position, as seen in phantom in FIGS. 2 and 4, for flight at subsonic velocities. This increases the wing span at low speeds and hence improves the flight characteristics for such conditions.

While a variety of mechanisms may be employed for effecting the movement of the wing tips between the vertical and horizontal positions, the arrangement seen in FIG. 5 illustrates one workable design. The construction for only one wing tip is illustrated, both being similar. A pressure cylinder 10, which may be hydraulic or pneumatic, is pivotally mounted by pin 11 to fixed structure 12 within the wing 2. A rod 13 projects outwardly from the cylinder 10, being connected with the piston inside of the cylinder. The distal end of rod 13 extends into the wing tip 8 and by pin 14 is joined to the wing tip structure at a point spaced from the shaft 15 that mounts the wing tip on the wing.

It is apparent, therefore, that with the rod 13 in the retracted phantom line position of FIG. 5, the rod will pull inwardly at the pin 14, which is disposed above the pivot point of the wing tip element. This rotates the end plate 8 to the raised position shown where it is held to form the wing tip for subsonic flight. However, upon extension of rod 13 the element 8 is caused to pivot downwardly, as seen in solid lines, where it acts as an end plate for flight at higher Mach numbers.

Movable control surfaces 16 may be carried by the wing tip elements 8 and 9 for providing roll control for the aircraft. Alternatively, the surfaces 16 may constitute flaps for lift augmentation.

At the aft portion of the body are tail surfaces 19 and 20 projecting laterally outward substantially in the horizontal plane. Pitch control may be obtained by means of movable surfaces 21 and 22 carried by the elements 19 and 20.

Projecting upwardly from the aft portion of the body is a vertical stabilizer 23 that includes a pivotal surface 24 for yaw control. It is apparent that the surfaces 19 and 20 and 23 could be made all-movable, if desired, obviating the necessity for the separate controls 21, 22 and 24.

Figure 3:
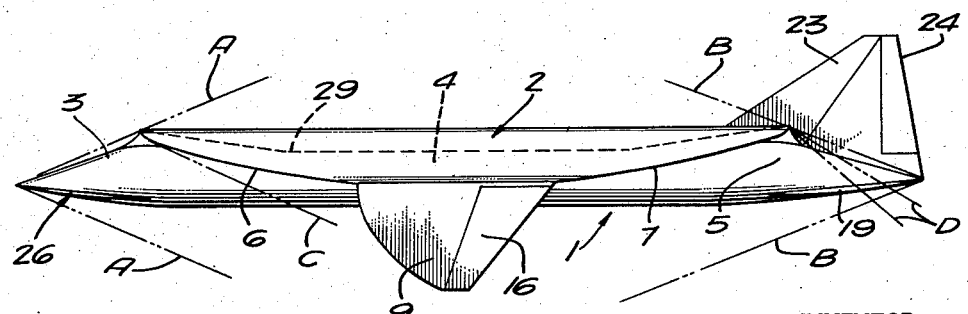
FIG. 3 is a side elevational view thereof.

The nose section 3 of the body 1 is usually of pointed configuration, as illustrated, with the forward end located substantially at the apex of the front shock cone A. The median line of the nose section 3 may be cambered downwardly, as best seen in FIG. 3, in order that necessary increase of cross section may take place over a reasonable length—at least twice the maximum mean diameter—while assuring that the body nose is at the apex of the shock cone. Most of the cross sectional area increase should occur ahead of the shock from the lower side of the leading edge 7 of the wing.

A wing-like canard surface 26 is carried by the lower portion of the nose section of the body. The leading edge 27 of the canard lies approximately along the surface of the front Mach cone A. The forward point of the canard is substantially at the apex of the cone A so that the canard has a sonic leading edge. The angle of the canard surface, therefore, will be approximately $$\arc\tan \frac{1}{\sqrt{M^2-1}}$$

i.e., the same angle as that for the shock cone. The exact value for this angle is adjusted to minimize the drag of the canard-nose section-wing combination.

The purpose of the canard 26 is to optimize the load distribution over the forward half of the aircraft. It has been demonstrated that wave drag is at a minimum when an ellipitical axial load distribution is achieved. In other words, the load curve from the nose to the tail of the aircraft in a plane falling along the axis of the body should be substantially an ellipse.

Therefore, by appropriate dimensions for the canard 26, as well as its exact location and angle of attack, a substantially elliptical load distribution can be provided for the forward half of the aircraft. Generally, the canard will be approximately as illustrated in the drawing, located at the lower portion of the nose section and given a small angle of attack. The canard may be quite small in dimension as shown.

As a result of the inclusion of the canard 26, therefore, pressure drag may be minimized for a given lift, overall length and dynamic pressure, provided that symmetrical loading is obtained on the rear half of the aircraft. The wing design and body arrangement serve to accomplish the latter purpose.

The resulting design has several important advantages over previously devised aircraft configurations. With this construction, the disturbances created as the forebody passes through the air at supersonic velocity react on the undersurface of the wing to provide lift. Thus, the static pressure rise resulting from the shock wave at the nose of the body 1 is captured beneath the wing and yields a useful lifting force. This results because the wing leading edge substantially is coincident with the cone of the shock wave. The pressure rise across the shock wave causes a high static pressure to exist in the underwing zone—just aft of the front shock cone—which thereby exerts an upward lifting force on the wing.

The lateral as well as vertical forebody disturbances are retained beneath the wing by virtue of the negative wing dihedral and the end plates 8 and 9. The end plates and downwardly curved wing reduce the pressure loss due to spillage across the wing tips, reflecting the forebody disturbances inwardly across the underside of the wing. This means that a maximum amount of the energy from the body disturbances is conserved, and a large amount of induced lift is realized. The absence of flow outwardly across the wing tips also means that vortex drag is eliminated. The end plates are kept to a reasonable size by reason of the negative dihedral of the wing which assists in retaining the disturbances beneath the wing. Nevertheless, by being defined by planes that intersect the double Mach cone, the end plates simulate barriers of infinite dimension which allow none of the laterally directed disturbances to flow outwardly past the wing tips.

By virtue of their mid-chord relationship with respect to the wing, the end plates may be provided with lift augmentation devices such as the flaps 16. In the past, without so positioning the end plates, they could not incorporate high lift devices. This is because a large nose-down pitching movement would result from lift augmentation on rearwardly positioned end plates. Other lift devices can be used for the end plates of this invention, such as a blowing slot in the end plate trailing edge, or a downwardly directed blowing slot to increase the effective aspect ratio.

The disturbances used in generating lift in connection with this invention are obtained from a full body, which contrasts with prior designs where half bodies were utilized beneath the wing. Use of a full body is of paramount importance because of the fact that the wave drag for a half body is approximately double that encountered with a full body of equivalent frontal area. Furthermore, when the wing has a positive angle of attack, the consequent high drag of a half body, and drag produced by such a body on the wing under such conditions, are avoided by the design of this invention where a full body is utilized. The use of a full body, therefore, permits the efficient utilization of induced lift without the drag penalty encountered where a half body is employed for this purpose.

The design of this invention also permits the wing to operate at a very small or, in some cases, zero angle of attack. By allowing the wing to pass through the air without a large positive angle of attack—made possible by obtaining adequate lift from the disturbances of the full body—a substantial reduction in drag is realized.

Even in instances where it may be desired to impart some positive angle of attack to the wing, a significant saving in drag is effected. When the wing is given a positive angle of attack, the resulting pressure field is confined to approximately the same location as the pressure region due to the body-induced lift. In other words, the wing leading edge shock wave, indicated by the line C, is swept back approximately at the Mach angle. This occurs because the leading edge is contoured to fall approximately along the surface of the Mach cone. As a result, the leading edge shock wave crosses the body at or behind the location of maximum body thickness. Thus, the pressure due to lift does not contact the forebody. Therefore, increasing angle of attack will not increase the drag of the forebody. No positive pressure from the lift of the wing is imposed upon the portion of the body that is increasing in area in an aft direction.

With the symmetrical design provided by the aircraft configuration of this invention, the afterbody 5 is immersed in the high pressure air beneath the wing. This results from the pressure reflected downwardly from the disturbances captured beneath the wing. This includes pressure both from the disturbances of the full body 1, and any pressure resulting from a positive angle of attack given to the wing. This means that the afterbody is subjected to a positive pressure, this being a section which is tapering in thickness in the rearward direction. Hence, in place of the usual negative pressure at the aft portion of the aircraft, which normally gives considerable drag, a positive pressure exists at this location. By reacting against the rearwardly tapering surface of the afterbody, a forward force component results. Therefore, an actual thrust is obtained by virtue of the pressures present at the aft portion of the aircraft.

It may be noted that the expansion field of the wing trailing edge, indicated by the lines D, is confined to a conical region, the semi-vertex angle of which is $$\arc \tan \frac{1}{\sqrt{M_1^2-1}}$$

where $M_1$ is the local Mach number before expansion. This zone of decreasing pressure, by being so limited in dimension, will not affect the afterbody and will not reduce the positive pressure at this location.

It can be seen, therefore, that as a result of the positioning and contour of the wing, as well as the configuration of the full body, the pressure due to wing lift and the thickness disturbances become beneficial in reducing the afterbody drag.

Pressure (or wave) drag which arises due to body and wing thickness is transformed and does not penalize the performance of the aircraft of this invention. Drag due to lift also is reduced because by the design of this invention a near-optimum load distribution may be achieved, and also a substantial part of the wave disturbance may be canceled by expansion over the wing rear section and fuselage afterbody. In most instances the parasite drag, therefore, becomes simply the drag due to skin friction. The drag is comparable to that experienced by aircraft which operate at subsonic speeds and hence have no wave or pressure drag.

By providing a sweep back for the leading edge 7 of the wing 2 along the surface of the Mach cone A, the transition from a condition of high spillage or upwash over the leading edge, as encountered at Mach number only slightly above one, to a condition of small spillage at design Mach number, is continuous. No inlet-type shock swallowing problem exists as the result of this design. Hence by the design of this invention, the drag at speeds lower than the design Mach number is no greater than that encountered with conventional configurations. This is in sharp distinction to previous configurations capable of appreciable wave drag cancellation at design Mach number.

An important aspect of the design of this invention is the manner in which the wing is secured to the body. This is accomplished so as to produce a design of great strength and rigidity, avoiding the use of struts. At the same time, the wave drag penalty is minimized. As may be seen in FIG. 6, where the body is illustrated with the wing removed, the upper edge 29 of the body 1 is broad laterally where it is secured to the lower surface of the wing. This thick attaching point permits adequate structure to be supplied to give necessary strength and rigidity to the airframe.

In order to reduce wave drag penalty, the aircraft is constructed so that the areas aft of the wing leading edge cut by all planes inclined at the local Mach angle are constant. In other words, for example, the area of a plane interconnecting line $E_1$ and $E_2$ is made to equal the area intersected by a plane along lines $F_1$ and $F_2$, each of these planes being disposed at the same inclination as the Mach angle at its location. This is accomplished at the forward portion of the central part of the body by imposing a negative wedge on the positive wedge provided by the body contour. Hence, the vertical body thickness tapers downwardly from the upper forward portion of the central body section along the inclined recessed portion 30. The body is shaped, however, so that the cross sectional areas at the planes $E_1$–$E_2$ and $F_1$–$F_2$, as well as all others inclined at the local Mach angle, are the same. It can be seen that a thick section of increasing depth extends downwardly from the wing to insure the proper relationship between area and the Mach angle planes.

Similarly, the aft portion of the body may have the reverse effect, with the wedge tapering upwardly in the same manner. Hence, the areas cut by planes inclined forwardly at the local Mach angle, and forward of the wing trailing edge, also cut equal areas. This provides symmetry in design and conforms to the principle that for minimum drag due to lift, the down wash should be the same for forward or reverse flow.

Various arrangements are possible in accordance with the design of this invention for mounting the engines and the landing gear. One example may be seen in FIGS. 7 and 8. According to this design these elements are included in the end plates for the wing. Thus, the vertical portion of the end plates may house a pair of jet engines 32 and 33 disposed one above the other. At the forward edge of this end plate is an inlet 34 which is split by a center body wedge 35. The landing gear may comprise a pair of wheels 36 and 37, mounted in tandem and carried by a pivotal strut 38. In the raised position the strut is rotated upwardly and the cross member 39 for the wheel axles is pivoted to a position of substantial alignment with the strut. This positions the wheels within the mold line of the end plate for the flight position. When lowered, the strut is rotated downwardly to assume a vertical position, while the member 39 is shifted to a horizontal attitude. The wheels 36 and 37 then are disposed at the lowermost portion of the aircraft, providing widely spaced and stable landing points for the aircraft.

Another advantage realized by the configuration of this invention is that in the event of an emergency landing where the landing gear cannot be extended, the impact is not borne by the fuselage. The end plates provide spaced units to absorb such shocks, thus making the aircraft much more safe for passengers than conventional designs.

Furthermore, if it should be necessary to ditch the aircraft at sea, the end plates provide a catamaran-like stability, greatly lessening the danger of such landings. Also, if desired, pontoons may be incorporated in the end plates to allow the aircraft to act as a flying boat.

One extremely beneficial result from the negative wing dihedral and end plates—particularly noticeable where the end plates remain in a vertical position at all times—is the ground effect experienced near the surface of the earth. The restraint on escape of air beneath the wing gives an air cushion that facilitates take off and landings of the aircraft. The aircraft thereby takes off and lands on a ground effect cushion produced by the dynamic pressure on the underside. This ground effect—which is significantly greater than that achieved by conventional aircraft having no such lateral restraint on the escape of air—also lessens the hazards of emergency landings on land or water.

From the foregoing it can be seen that I have provided an improved aircraft configuration employing advantageously the principles of indirect lift without encountering drag penalties. By the use of a continuous attachment to the wing along the upper edge of the body, an airframe of great structural rigidity is possible. Nevertheless, the body is shaped and extended below and in front of the wing in accordance with supersonic area rule principles so that the drag approximates that obtained by a full body. Full body drag is only half of that for a half body of equivalent length and cross section. The canard surface permits the ideal elliptical load distribution to be obtained over the entire body length, interfering advantageously with the body-wing flow field so as to further reduce the already low drag due to lift. The end plates, as well as the negative dihedral of the wing, serve to capture the lateral shock disturbances permitting induced lift to be obtained while drag is diminished. Movable end plates permit maximum effectiveness at supersonic flight while increasing the wing span and reducing landing velocity when positioned in the horizontal direction. The negative dihedral of the wing allows the end plates to be of minimum dimensions.

The foregoing detailed description is to be clearly understood as given by way of illustration and example only, the spirit and scope of this invention being limited solely by the appended claims.

I claim:
1. An aircraft capable of flight at a design Mach number greater than one comprising
    a wing member,
    and a full body attached to the undersurface of said wing member for reflecting disturbances under said wing member and inducing lift on said wing member,
        said wing member including means depending downwardly to a point below the level of the bottom of said body for reflecting inwardly toward said body lateral disturbances from said body during flight.
2. A device as recited in claim 1 in which said body includes a forwardly tapering forebody portion, and a rearwardly tapering afterbody portion.
3. An aircraft capable of supersonic flight comprising
    a wing member;
    and a body member,
        said body member having a full body cross section,
        a forwardly tapering forebody,
        an afterwardly tapering afterbody,
            said wing member being attached to the upper edge of said body intermediate said forebody and said afterbody,
        said wing member having a negative dihedral,
        a swept back leading edge
        and a swept forward trailing edge.
4. An aircraft capable of flight at a supersonic design Mach number comprising
    a body of full body cross section,
        said body having a forwardly tapering forebody portion and an aftwardly tapering rear body portion;
    and a wing member attached to the upper edge of said body intermediate said forebody and said afterbody,
        said wing member having a negative dihedral,
        a leading edge swept back to fall substantially along the surface of the bow shock cone produced by said body at said design Mach number,
        and a trailing edge swept forward to fall substantially along the surface of the rear Mach cone of said body at said design Mach number.
5. A device as recited in claim 4 in which all planes inclined substantially at the local Mach angle at said design Mach number, intersecting said body intermediate said forebody and said after body portions, cut substantially equal areas.
6. A device as recited in claim 4 in which
    at the attachment between said body and said wing said body at the forward portion of said attachment flares outwardly toward the rear in the lateral direction and tapers toward the rear in the vertical direction,
        said body being dimensioned such that all planes aft of the wing leading edge inclined at the local Mach angle at said design speed which intercept said body cut equal areas thereof.

7. A device as recited in claim 6 in which
at the rearward edge of said attachment of said wing to said body said body flares laterally outward forwardly and tapers vertically downward forwardly,
said rearward portion being substantially symmetrical with said flaring and tapered portions of said forward portion of said attachment to said wing member.

8. A device as recited in claim 4 including in addition a canard airfoil surface projecting outwardly from said forebody,
said canard surface having a leading edge swept back to fall substantially along the surface of the bow shock cone produced by said body at said design Mach number.

9. A device as recited in claim 8 in which
said canard surface is provided with a relatively small angle of attack
and is dimensioned whereby said canard surface provides substantially elliptical axial load distribution upon said aircraft.

10. A device as recited in claim 4 in which said wing member includes substantially vertically depending end plates at the tips thereof.

11. A device as recited in claim 10 in which said end plates are movable from said vertical position to a more nearly horizontal position for providing stable flight at speeds below said design Mach number.

12. A device as recited in claim 10 in which said negative dihedral of said wing and said end plate are dimensioned and positioned to reflect backwardly toward said body substantially all lateral disturbances resulting from the passage of said body through the atmosphere at said design Mach number.

13. A device as recited in claim 10 in which
said negative dihedral is such that said wing has tip portions substantially in alignment with the centerline of said body,
each of said end plates being at least equal in area to an intersection of a vertical plane at the wing tip with said cones.

14. An aircraft capable of flight at a supersonic design speed comprising
a wing member;
and a body member,
said body member having a full body cross section,
a forwardly tapering forebody portion,
an aftwardly tapering afterbody portion,
and a central body portion interconnecting said forebody and said afterbody portions,
said central body portion being of substantially constant cross section for a major portion of its length,
said wing member being attached at its broadest part in the fore and aft direction to the upper edge of said central body portion along a relatively thick contacting area,
said wing having a negative dihedral,
the leading edge of said wing being swept back to fall substantially along the surface of the bow shock cone generated by said forebody at the design speed of said aircraft,
and the trailing edge of said wing being swept forwardly to fall substantially along the rear Mach cone of said body at said design speed.

15. A device as recited in claim 14 including in addition
a canard surface secured to said forebody portion,
said canard surface extending substantially to the forward tip of said forebody portion and having a leading edge substantially falling along said front shock cone,
said canard surface being positioned angularly to produce a substantially elliptical axial loading on said aircraft.

16. A device as recited in claim 14 in which
said central body portion adjacent the leading edge of said wing is on either side recessed inwardly along a section extending downwardly and to the rear,
said body being proportioned such that all planes aft of the wing leading edge inclined at the local Mach angle intersect substantially equal areas,
said central body portion adjacent the trailing edge of said wing being substantially symmetrical to said portion beneath said leading edge.

17. A device as recited in claim 14 including in addition
an end plate at either tip of said wing,
said end plates extending substantially vertically and being at least substantially as large as a plane intersecting said front shock cone and said rear Mach cone,
said negative dihedral of said wing being such that the upper edge of each wing tip is aligned horizontally substantially with the centerline of said body and is attached to the mid-chord of said wing.

18. A device as recited in claim 17 including in addition
a landing gear for said aircraft,
said landing gear being incorporated in said end plates, thereby providing said aircraft with a stable landing arrangement.

19. A device as recited in claim 17 including in addition a lift augmentation means associated with said end plates.

References Cited by the Examiner
UNITED STATES PATENTS
3,093,348  6/63  Schelp _____ 244—15

MILTON BUCHLER, *Primary Examiner.*

RALPH D. BLAKESLEE, *Examiner.*